US010215167B2

(12) United States Patent
Brogle et al.

(10) Patent No.: US 10,215,167 B2
(45) Date of Patent: Feb. 26, 2019

(54) CONNECTING ROD WITH MODIFIED END

(71) Applicant: Howden Thomassen Compressors, Rheden (NL)

(72) Inventors: Bernd Brogle, Hoog Keppel (NL); Antal Langelaar, Rheden (NL); Petrus Nicolaas Duineveld, Angerlo (NL)

(73) Assignee: Howden Thomassen Compressors BV, Rheden (NL)

( * ) Notice: Subject to any disclaimer, the term of this patent is extended or adjusted under 35 U.S.C. 154(b) by 192 days.

(21) Appl. No.: 15/301,803

(22) PCT Filed: Apr. 4, 2014

(86) PCT No.: PCT/EP2014/056850
§ 371 (c)(1),
(2) Date: Oct. 4, 2016

(87) PCT Pub. No.: WO2015/149872
PCT Pub. Date: Oct. 8, 2015

(65) Prior Publication Data
US 2017/0122301 A1    May 4, 2017

(51) Int. Cl.
*F01B 9/00* (2006.01)
*F04B 39/00* (2006.01)
(Continued)

(52) U.S. Cl.
CPC .......... *F04B 39/0022* (2013.01); *F04B 39/12* (2013.01); *F04B 53/144* (2013.01);
(Continued)

(58) Field of Classification Search
CPC ...... F16C 7/02; F16C 7/023; F16J 1/14; F16J 1/16; F16J 7/00; F04B 39/0022
See application file for complete search history.

(56) References Cited

U.S. PATENT DOCUMENTS 1,636,438 A * 7/1927 Riesner ............... F04B 39/0022
                                                        92/134
2,846,897 A    8/1958 Schall
5,660,086 A    8/1997 Carey

FOREIGN PATENT DOCUMENTS

EP          0229227 A2    7/1987
WO     2010/081456 A1    7/2010
(Continued)

OTHER PUBLICATIONS

Korean Office Action of Korean Patent Application 10-2016-7030597 dated Dec. 7, 2017 with English translation (15 pages).
(Continued)

*Primary Examiner* — Michael Leslie
(74) *Attorney, Agent, or Firm* — Edell, Shapiro & Finnan, LLC

(57) ABSTRACT

A connecting rod (24) has a modified end adapted to ensure that a lubricant film of sufficient thickness exists in an end bearing thereof when the connecting rod is placed in both tension and compression. The connecting rod includes an elongated body portion or shaft (40), a big end (42) defining a first coupling bore (44) at a first longitudinal end of the body portion (40), and a small end (46) defining a second coupling bore (48) at a second longitudinal end of the body portion (40). The small end (46) and the big end (42) each have a proximal side (50,52) nearest the shaft (40) and a distal side (54,56) furthest from the shaft (40). An opening (100) is formed in the shaft (40) adjacent the proximal side (52) for adjusting a stiffness of the proximal side (52).

18 Claims, 4 Drawing Sheets

(51) Int. Cl.
*F16J 7/00* (2006.01)
*F16C 7/02* (2006.01)
*F04B 53/14* (2006.01)
*F04B 39/12* (2006.01)
*F16J 1/12* (2006.01)
*F16J 1/18* (2006.01)

(52) U.S. Cl.
CPC .................. *F16C 7/02* (2013.01); *F16J 1/12* (2013.01); *F16J 1/18* (2013.01); *F16J 7/00* (2013.01)

(56) References Cited

FOREIGN PATENT DOCUMENTS

WO     2011/012625 A1    2/2011
WO     2012/150862 A2    11/2012

OTHER PUBLICATIONS

Chinese Office Action of CN 201480077750.7 dated Apr. 14, 2017 with English translation (17 pages).
International Search Report and Written Opinion dated Jan. 8, 2015 for PCT Application, PCT/EP2014/056850 filed Apr. 4, 2014.
Japanese Office Action of JP 2017-503052 dated Aug. 8, 2017 with English translation (12 pages).

\* cited by examiner

CONNECTING ROD WITH MODIFIED END

FIELD OF THE DISCLOSURE

The disclosure relates generally to the field of reciprocating drive mechanisms, and more particularly to an improved connecting rod design for use in such mechanisms.

BACKGROUND OF THE DISCLOSURE

A conventional reciprocating drive mechanism typically includes one or more connecting rods that translate the rotary movement of a crankshaft into linear, reciprocating movement for driving respective piston rods. A typical connecting rod includes an elongated shaft that terminates at a first longitudinal end in a so-called "big end" having a relatively large, transverse bore formed therethrough for facilitating coupling to a crankshaft. The shaft terminates at a second longitudinal end in a so-called "small end" having a relatively smaller transverse bore formed therethrough for facilitating coupling to a piston or piston rod. The big end and the small end thus define respective, generally annular members at opposing longitudinal ends of the shaft of the connecting rod, each annular member having a proximal side that is connected directly to the shaft and a distal side that is spaced apart from, and not connected directly to, the shaft.

An annular journal bearing is typically shrink-fit within the small end bore of a connecting rod for rotatably engaging a cylindrical crosshead pin that extends therethrough. A film of lubricant can be provided in a small annular gap between the crosshead pin and the journal bearing to ensure smooth rotation of the pieces and to minimize wear. Since the orientation of the journal bearing is fixed relative to the small end of the connecting rod, the journal bearing has a proximal side and a distal side that correspond to the proximal side and distal side of the small end, respectively.

As the connecting rod reciprocates during operation, the small end of the rod and its respective journal bearing rotate about and alternatingly push and pull the crosshead pin that extends transversely therethrough. It has been observed that, during such reciprocation, the small end and the journal bearing may undergo asymmetric deformation. Particularly, when the small end and the journal bearing pull the crosshead pin (i.e., when the connecting rod is in tension), the distal sides of the small end and the journal bearing may deflect or deform away from the crosshead pin due to resistance from the crosshead pin and from the film of lubricant located between the crosshead pin and the distal side of the journal bearing. By contrast, when the small end and the journal bearing push the crosshead pin (i.e., when the connecting rod is in compression), the proximal side of the small end, which is directly connected to and supported by the rigid shaft of the connecting rod, resists deformation. The proximal side of the journal bearing, which is supported by the proximal side of the small end, therefore also resists deformation. Thus, instead of deforming or deflecting away from the crosshead pin, the proximal sides of the small end and the journal bearing overcome the resistance of the lubricant film, causing the gap between the proximal side of the journal bearing and the crosshead pin to be compressed. Some or all of the lubricant in the gap is thereby forced out and the film of lubricant in the gap is thereby thinned or entirely evacuated. Such thinning of the lubricant film can result in excessive and/or uneven wear on the journal bearing and the crosshead pin, which may have a deleterious effect on the reciprocating compressor as a whole.

One attempted solution that has been implemented for mitigating the above-described lubricant thinning is the use of high viscosity lubricants that provide greater resistance against compression. However, the use of such high viscosity lubricants results in increased friction and associated losses in power. Another attempted solution has been to use a larger diameter bearing, but an efficient solution has yet to be achieved.

SUMMARY

In view of the foregoing, it would be advantageous to provide a compressor having a connecting rod that is adapted to maintain a lubricant film of sufficient thickness in a small end journal bearing thereof when the connecting rod is placed in both tension and compression without incurring significant power losses.

An exemplary connecting rod in accordance with the present disclosure may include an elongated shaft, a big end defining a first transverse coupling bore at a first longitudinal end of the shaft, and a small end defining a second transverse coupling bore at a second longitudinal end of the shaft. The big end may have a proximal side nearest the shaft and a distal side furthest from the shaft. The small end may also have a proximal side nearest the shaft and a distal side furthest from the shaft. An opening may be formed in the shaft adjacent one of the proximal side of the big end and the proximal side of the small end for reducing a stiffness of such proximal side.

An exemplary compressor in accordance with the present disclosure may include a piston for compressing a fluid within a cylinder, and a drive shaft connected at a first longitudinal end to the piston and connected at a second longitudinal end to a crosshead assembly. The compressor may further include a connecting rod having an elongated shaft, a big end defining a first transverse coupling bore at a first longitudinal end of the shaft, the big end having a proximal side nearest the shaft and a distal side furthest from the shaft, and a small end defining a second transverse coupling bore at a second longitudinal end of the shaft, the small end having a proximal side nearest the shaft and a distal side furthest from the shaft. The big end may be coupled to a crankshaft, and the small end may be coupled to the crosshead assembly by a crosshead pin that extends through the second coupling bore and the crosshead assembly. An opening may be formed in the shaft adjacent one of the proximal side of the big end and the proximal side of the small end for reducing a stiffness of such proximal side.

DETAILED DESCRIPTION

Figure 1:
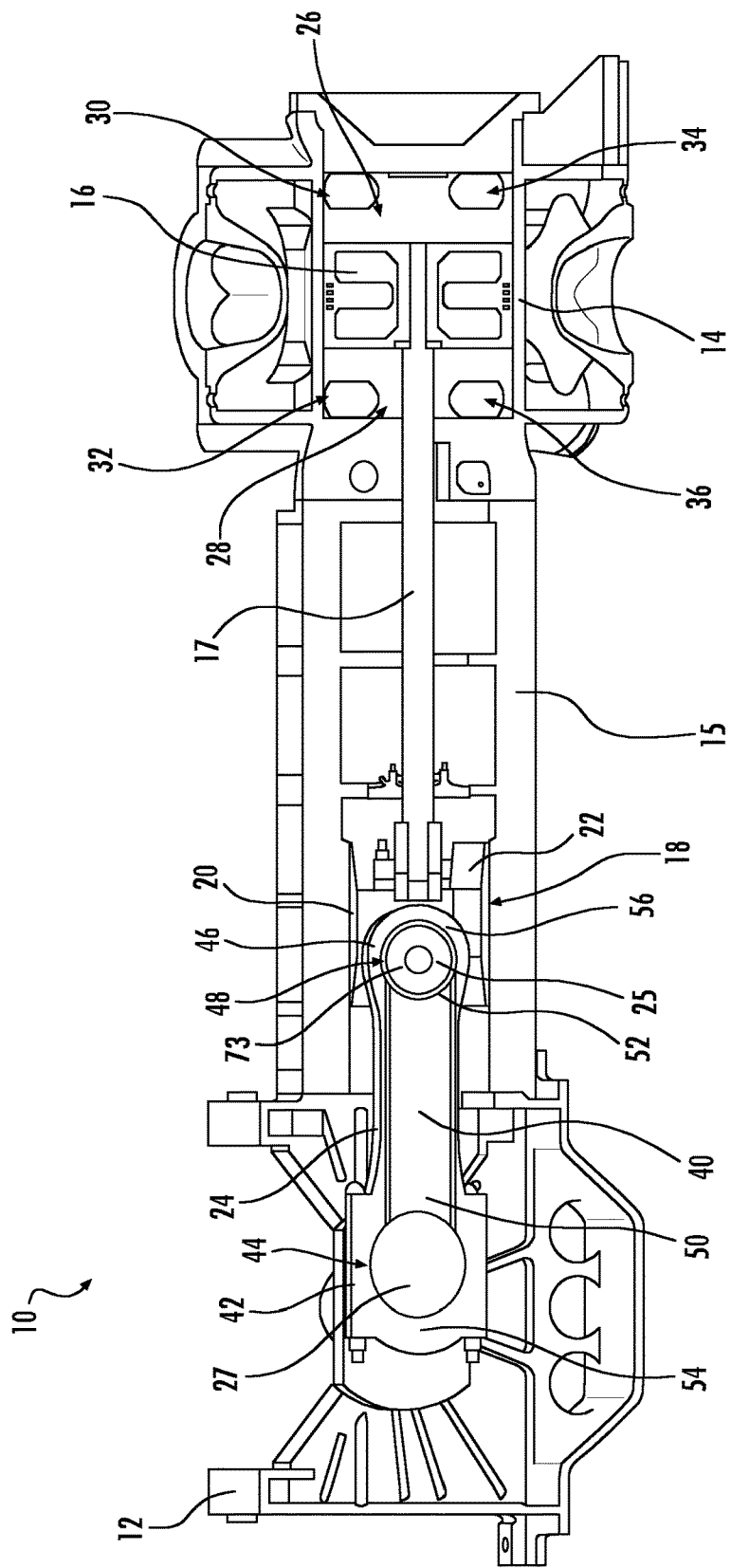
FIG. 1 is a side view in section illustrating an exemplary compressor in accordance with the present disclosure.

An apparatus in accordance with the present disclosure will now be described more fully hereinafter with reference to the accompanying drawings, in which preferred embodiments of the device are shown. This apparatus, however, may be embodied in many different forms and should not be construed as being limited to the embodiments set forth herein. Rather, these embodiments are provided so that this disclosure will be thorough and complete, and will fully convey the scope of the apparatus to those skilled in the art. In the drawings, like numbers refer to like elements throughout.

Referring to FIG. 1, an exemplary embodiment of a reciprocating compressor 10 (hereinafter "the compressor 10") in accordance with the present disclosure is shown. For the sake of convenience and clarity, terms such as "top," "bottom," "radial," "axial," "upper," "lower," "vertical," "horizontal," "right," "left," "lateral," and "longitudinal" will be used herein to describe the relative placement and orientation of the compressor 10 and its various components, each with respect to the geometry and orientation of the compressor 10 as it appears in FIG. 1. Said terminology will include the words specifically mentioned, derivatives thereof, and words of similar import.

The compressor 10 may include a frame 12, a cylinder 14, and a guide housing 15. The cylinder 14 may contain a piston 16 which is reciprocably movable along its longitudinal axis within the cylinder 14 as further described below. A piston rod 17 may be connected at a first end to the piston 16, and may be connected at a second end to a crosshead assembly 18 that is movably disposed within the guide housing 15. The crosshead assembly 18 may include crosshead shoes 20, 22 which conformingly and slidably engage the interior surface of the guide housing 15 for facilitating reciprocating movement of the crosshead assembly 18 along a linear path within the guide housing 15.

The crosshead assembly 18 may be reciprocatingly driven by a connecting rod 24 that may be pivotably coupled at a first end to the crosshead assembly 18 by a crosshead pin 25 (as described in greater detail below) and rotatably coupled at a second end to a rotatably driven crankshaft 27. As will be understood, the connecting rod 24 translates the rotary movement of the crankshaft 27 into reciprocating, linear movement that is imparted to the crosshead assembly 18 and the connected piston rod 17 and piston 16.

The compressor 10 may be of the double-acting type, having compression chambers 26, 28 located on either side of the piston 16 within the cylinder 14. Each of the compression chambers 26, 28 may be provided with an inlet valve 30, 32 and an outlet valve 34, 36, respectively. Upon movement of the piston 16 in the direction of the crank mechanism (i.e., to the left in FIG. 1), a fluid (e.g., any compressible substance) at a suction pressure may be introduced by way of the inlet valve 30 into the compression chamber 26. At the same time, the fluid present in the compression chamber 28 may be compressed and discharged at a discharge pressure by way of the outlet valve 36. Similarly, upon movement of the piston 16 away from the crank mechanism (i.e., to the right in FIG. 1), fluid at a suction pressure may be introduced by way of the inlet valve 32 into the compression chamber 28. At the same time, the fluid present in the compression chamber 26 may be compressed and discharged at a discharge pressure by way of the outlet valve 34. Fluid is thereby continuously moved into and out of the cylinder 14. Although not shown, a source of fluid may be coupled to the inlet valves 30, 32 of the compression chambers 26, 28, and the outlet valves 34, 36 may be coupled to appropriate discharge conduits.

The connecting rod 24 of the compressor 10 may include a body portion 40 that terminates in a so-called "big end" 42. The big end 42 may have a relatively large, transverse coupling bore 44 formed therethrough for receiving the crankshaft 27. At its opposite end, the body portion 40 may terminate in a so-called "small end" 46. The small end 46 may have a relatively smaller transverse coupling bore 48 formed therethrough. The smaller transverse coupling bore 48 may receive the crosshead pin 25 to couple the connecting rod 24 to the crosshead assembly 18, as further described below. The big end 42 and the small end 46 of the connecting rod 24 thus may define respective, generally annular elements on opposing longitudinal ends of the body portion 40. Thus, the big end 42 and small end 46 may each have a respective proximal side 50, 52 disposed directly adjacent to the body portion 40, and a respective distal side 54, 56 that is spaced longitudinally apart from the body portion.

Figure 2:
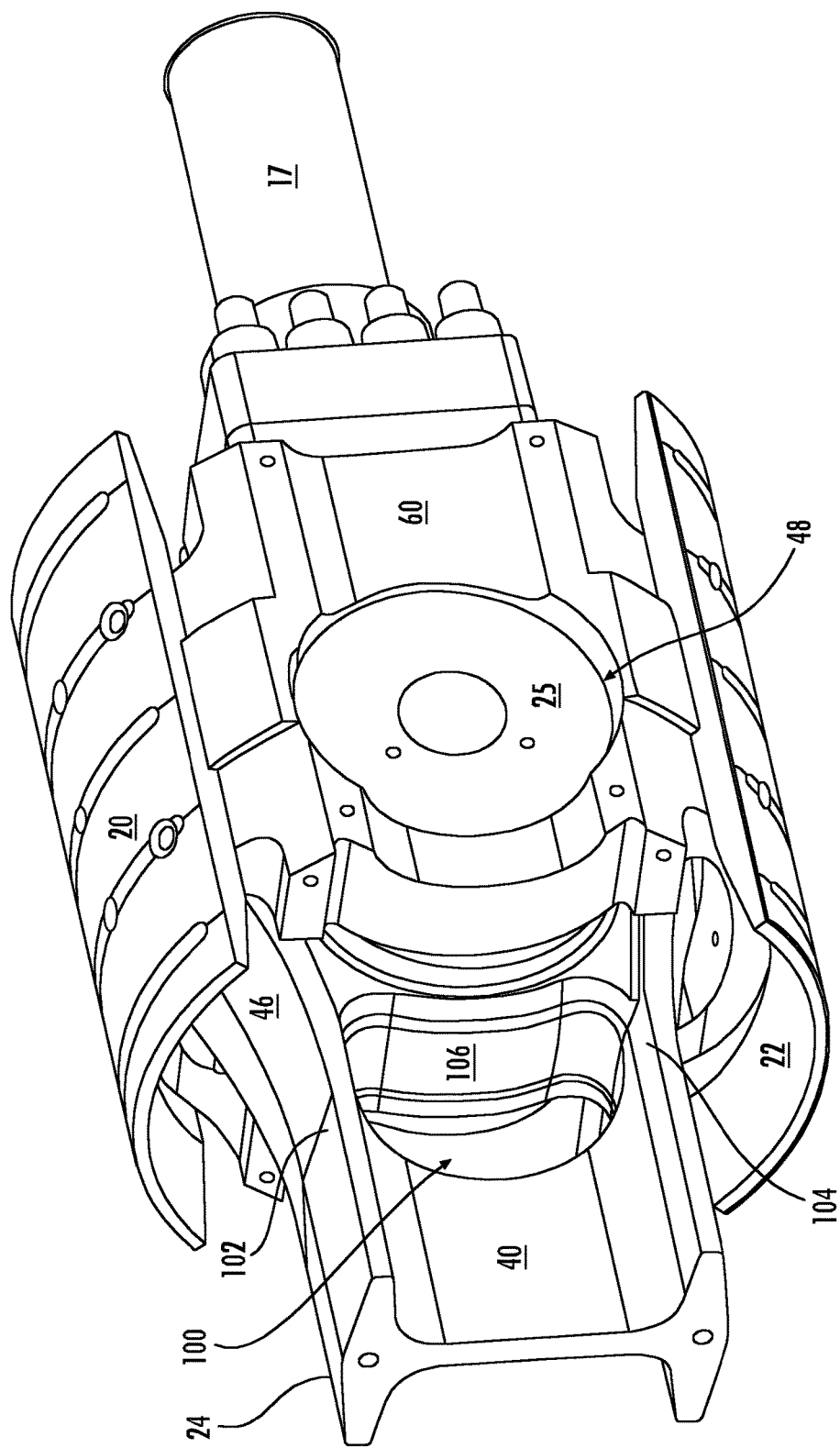
FIG. 2 is a perspective view illustrating the crosshead assembly and the small end of the connecting rod of the exemplary compressor shown in FIG. 1.
Figure 3:
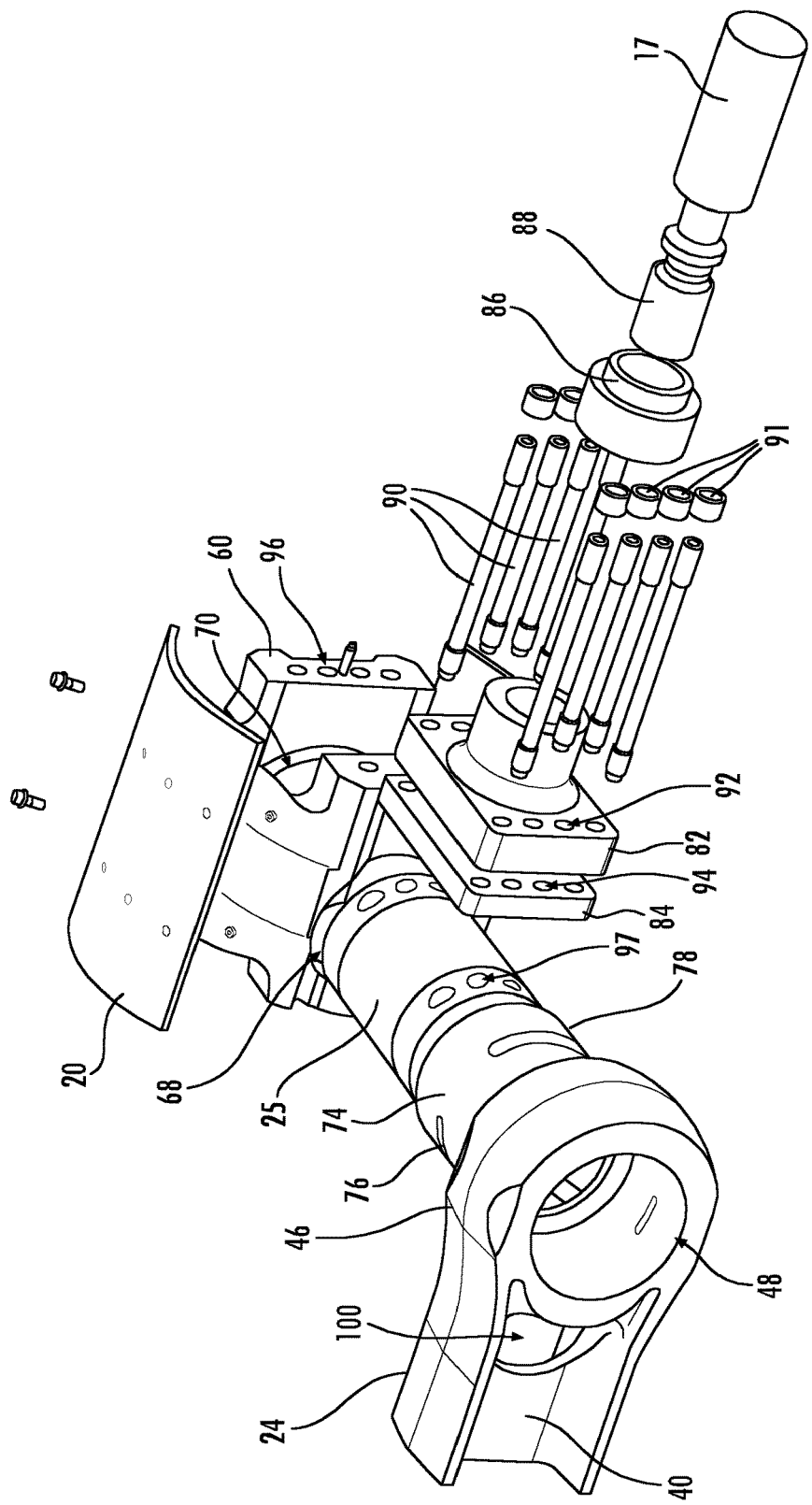
FIG. 3 is an exploded perspective view illustrating the crosshead assembly and the small end of the connecting rod of the exemplary compressor shown in FIG. 1.

FIGS. 2 and 3 illustrate the crosshead assembly 18 and the small end 46 of the connecting rod 24. The body portion 40 of the connecting rod 24 is shown as having an I-profile, but this is not critical, and it will be appreciated that the body portion 40 can have any of a variety of other appropriate profiles without departing from the present disclosure.

The crosshead assembly 18 may include a crosshead body 60 which is provided with two curved crosshead shoes 20, 22 that are arranged to slide along corresponding rectilinear guides (not shown) within the guide housing 15 (shown in FIG. 1). As best shown in FIG. 3, the connecting rod 24 may be pivotably coupled to the crosshead body by a cylindrical crosshead pin 25 that extends through opposing eyelets 68, 70 provided in the sidewalls of the crosshead body 60, and through an annular sleeve bearing 74 that may be fixed within a bore 48 of the small end 46 of the connecting rod 24, such as by shrink fitting, mechanical fasteners, or adhesives. The sleeve bearing 74 may have a proximal side 76 and a distal side 78 that correspond to, and are located adjacent, respective proximal and distal sides 52 and 56 of the small end 46 of the connecting rod 24. Referring again to FIG. 1, a film of lubricant (hereinafter referred to as "the lubricant film 73") may be provided in an annular gap located radially intermediate the crosshead pin 25 and the sleeve bearing 74. The small end 46 of the connecting rod 24 and the sleeve bearing 74 may therefore pivot freely and smoothly about the crosshead pin 25 within the crosshead body 60.

The crosshead assembly 18 may also couple to the piston rod 17 of the compressor. Thus, the piston rod 17 may extend through a mounting flange 82 of the crosshead assembly 18, and an optional abutting spacer plate 84, and may be held in firm engagement therewith by a threaded nut 86 that may extend into an opposing side of the mounting flange 82 and spacer plate 84 and may be fastened to a threaded end 88 of the piston rod 17. The mounting flange 82 and spacer plate 84 may be disposed in flat abutment with the crosshead body 18 and may be connected directly to the crosshead pin 25 by threaded studs 90 that are secured at one end by nuts 91 and that extend through corresponding holes 92, 94, 96, formed in the mounting flange 82, the spacer plate 84, and the crosshead body 60, respectively, and engage threaded bores 97 that are formed in the crosshead pin 25. The piston rod 17 may thereby be rigidly fixed to the crosshead pin 25 while simultaneously allowing the crosshead pin 25 to rotate freely about its axis relative to the sleeve bearing 74 and the small end 46 of the connecting rod 24 during operation of the compressor 10.

As best shown in FIG. 2, an opening 100 may be formed in the body portion 40 of the connecting rod 24 at a position immediately adjacent the proximal side 52 of the small end 46 and vertically intermediate a pair of legs 102, 104 that connect the body portion 40 to the proximal side 52. In the illustrated embodiment the opening 100 is a substantially kidney-shaped aperture that is partially defined by a sidewall 106 of the proximal side 52 which extends between the connecting legs 102, 104. The sidewall 106 may have a curvature that is substantially similar to the curvature of the bore 48 in the small end 46, and may have a radial thickness that is substantially equal to the radial thickness of the distal side 56 of the small end 46, but this is not critical. It is contemplated that the opening 100 may have any of a variety of other shapes and configurations, as will be described in greater detail below. Additionally, while the opening 100 is shown as extending entirely through the body portion 40, it is contemplated that the opening can alternatively extend only partially through the body portion.

As will be appreciated, the opening 100 may reduce the rigidity of the connecting rod 24 at the juncture of the shaft 40 and the proximal side 52 of the small end 46, thereby providing the proximal side 52 with greater flexibility (i.e. lower stiffness) than would be provided in the absence of the opening 100 (i.e., if the connecting rod were entirely solid at the juncture of the shaft 40 and the proximal side 52 as in conventional connecting rods). For example, the proximal side 52 of the small end 46 may have a stiffness that is substantially similar to the stiffness of the distal side 56 of the small end 46. While the opening 100 is located adjacent the small end 46, it is contemplated that the connecting rod 24 may additionally or alternatively be provided with a similar opening located adjacent the big end 42 for modifying the rigidity thereof in a substantially similar manner to that described above.

During operation of the compressor 10, the crankshaft 27 rotates and recriprocatingly drives the connecting rod 24, which in-turn reciprocatingly drives the crosshead assembly 18, the piston rod 17, and the piston 16 as described above. As the connecting rod 24 reciprocates longitudinally, the small end 46 of the connecting rod 24 and the sleeve bearing 74 pivot about and alternatingly push and pull the crosshead pin 25 that extends transversely therethrough. When the connecting rod 24 is placed in compression (i.e. when the connecting rod 24 moves to the right in FIG. 1), the proximal side 76 of the sleeve bearing 74, which supported by the proximal side 52 of the small end 46, forces the crosshead pin 25 to the right. Conversely, when the connecting rod 24 is placed in tension (i.e. when the connecting rod 24 moves to the left in FIG. 1), the distal side 78 of the sleeve bearing 74, which is supported by the distal side 56 of the small end 46, forces the crosshead pin 25 to the left.

As the crosshead pin 25 is alternatingly pushed and pulled by the connecting rod 24 in the manner described above, the lubricant film 73 may be compressed between the crosshead pin 25 and the sleeve bearing 74. Particularly, when the connecting rod 24 is placed in tension, the lubricant film 73 may be compressed between the connecting rod 24 and the proximal side 76 of the sleeve bearing 74, and when the connecting rod 24 is placed in compression, the lubricant film 73 may be compressed between the connecting rod 24 and the distal side 78 of the sleeve bearing 74. The proximal sides 52, 78 and the distal sides 56, 76 of the sleeve bearing 74 and the small end 46 are therefore alternatingly subjected to resistance from the lubricating film 73 and the underlying crosshead pin 25.

In some embodiments the opening 100 formed in the body portion 40 of the connecting rod 24 adjacent the proximal side 52 of the small end 46 may result in a stiffness of the proximal side 52 being substantially the same as the stiffness of the distal side 56 of the small end. Thus, when the connecting rod 24 is in compression, the lubricating film 73 may be compressed and the proximal sides 52, 76 of the sleeve bearing 74 and the small end 46 may be forcibly deformed away from the crosshead pin 25 by substantially the same amount that the lubricating film 73 may be compressed and the distal sides 56, 78 of the sleeve bearing 74 and the small end 46 may be forcibly deformed away from the crosshead pin 25 when the connecting rod 24 is in compression. The thickness of the lubricating film 73 between the crosshead pin 25 and the proximal side 76 of the sleeve bearing 74 when the connecting rod is in compression may therefore be substantially equal to the thickness of the lubricating film 73 between the crosshead pin 25 and the distal side 78 of the sleeve bearing 74 when the connecting rod 24 is in tension.

This is to be contrasted with a conventional connecting rod 24 that does not include an opening such as opening 100, such that the proximal side of the small end of the conventional connecting rod has a substantially higher stiffness than the stiffness of the distal side. Such conventional configurations are therefore susceptible to asymmetric deformation, in which the lubricant film between the crosshead pin and the sleeve bearing is significantly thinned or completely evacuated during the compression stroke relative to the tension stroke, which results in excessive and/or uneven wear on the crosshead pin and the sleeve bearing. The configuration of the connecting rod 24 of the present disclosure, and particularly the provision of the opening 100, prevent, or at least mitigate, such asymmetric deformation and excessive and/or uneven wear associated therewith.

Figure 4A:
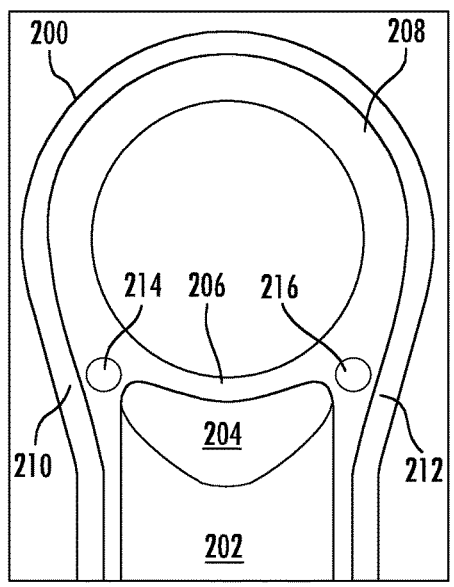
FIGS. 4*a-d* are side views illustrating exemplary alternative embodiments of the connecting rod of the present disclosure.
Figure 4B:
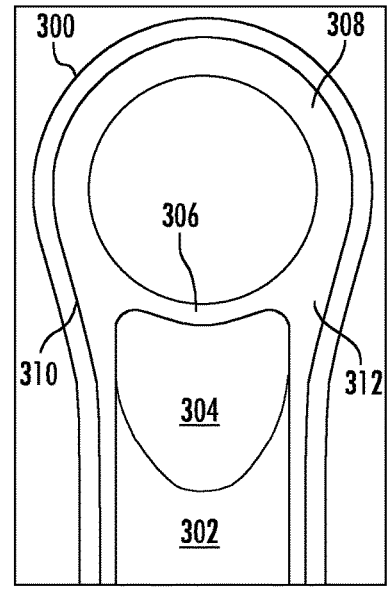

FIGS. 4a-4b illustrate several embodiments of connecting rods in accordance with the present disclosure. It should be understood that these embodiments are presented by way of example only, and that many variations of such embodiments are contemplated and may be implemented with similar features for reducing the stiffness of the proximal side of a small end of a connecting rod without departing from the present disclosure.

Referring to FIG. 4a, the connecting rod 200 may be substantially similar to the connecting rod 24 described above, including an I-profile body portion 202 with a kidney-shaped opening 204 positioned adjacent the proximal side 206 of the small end 208 and laterally intermediate a pair of connecting legs 210, 212. In the illustrated embodiment, the connecting rod 200 is also be provided with a pair of relief dimples 214, 216 (e.g. partial bores) formed in the connecting legs 210, 212, respectively. A pair of substantially identical relief dimples (not within view) may also be formed in the opposite side the connecting legs 210, 212. The relief dimples 214, 216 may be provided to further adjust the stiffness of the proximal side 206 of the small end 208 (i.e., in addition to the relief bore 204) in a desired manner.

Referring to FIG. 4b, the connecting rod 300 may be substantially similar to the connecting rod 24 described above, with an I-profile body portion 302 having an opening 304 formed therethrough adjacent the proximal side 306 of the small end 308 and laterally intermediate a pair of connecting legs 310, 312. The opening 304 of this embodiment is shown to be deeper than the relief bore 100 described above, thereby providing the proximal side 306 of the small end 308 with a different stiffness profile than that of the proximal side 52 of the small end 46 of the connecting rod 24.

Figure 4C:
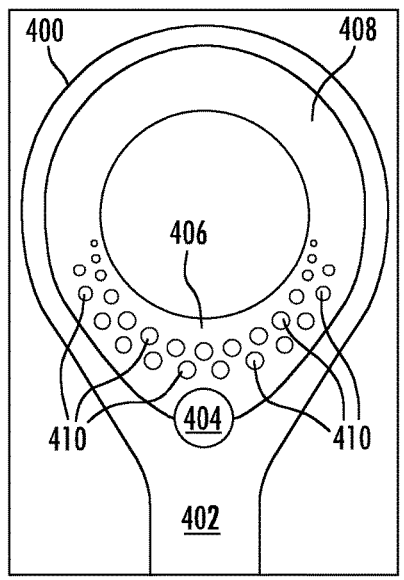

Referring to FIG. 4c, the illustrated connecting rod 400 may be provided with a body portion 402 that is substantially rod-shaped, as well as a small, circular opening 404 formed therethrough adjacent a proximal side 406 of a small end 408. The connecting rod 400 of this embodiment may also include a plurality of radially and circumferentially spaced smaller openings 410 formed in the proximal side 406 of the small end 408. In the illustrated embodiment the smaller openings 410 include a plurality of different sizes, with larger openings positioned adjacent the body portion 402, and smaller openings positioned adjacent the proximal side 406 of the small end 408. The combination of the circular opening 404 and the plurality of radially and circumferentially spaced smaller openings 410 may be employed to provide the proximal side 406 with a desired stiffness profile.

Figure 4D:
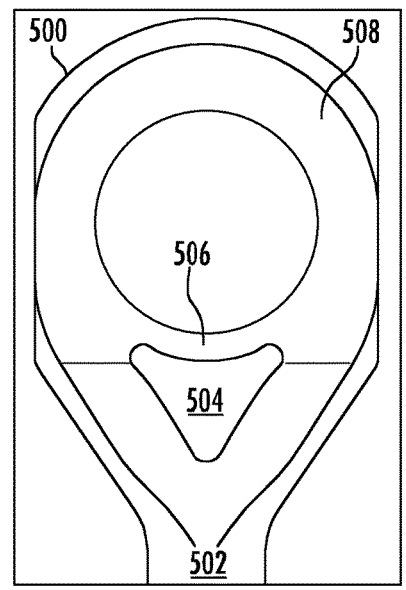

FIG. 4d shows a further embodiment of the disclosed connecting rod 500 that includes a rod-shaped body portion 502 and a substantially triangular opening 504 formed adjacent the proximal side 506 of the small end 508. As with the prior embodiments, the disclosed opening 504 may provide the proximal side 506 with a desired stiffness profile.

It will be apparent from foregoing disclosure that one or more relief bores and/or other relief features (e.g. dimples), such as may have a variety of different sizes, shapes, and configurations, can be formed in a connecting rod to tune the stiffness of the small end of the connecting rod in a desired manner. The disclosed arrangement can be used as a reciprocating drive mechanism in any of a variety of types of compressors known in the art.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

The invention claimed is:

1. A connecting rod, comprising:
a body portion; a big end defining a first coupling bore positioned at a first end of the body portion, the big end including a proximal side adjacent the body portion and a distal side spaced apart from the body portion;
a small end defining a second coupling bore positioned at a second end of the body portion, the small end including a proximal side adjacent the body portion and a distal side spaced apart from the body portion;
a first opening formed in the body portion adjacent one of the proximal side of the small end and the proximal side of the big end; and
a relief dimple formed in the body portion adjacent the first opening.

2. The connecting rod of claim 1, wherein the first opening extends completely through the body portion.

3. The connecting rod of claim 1, wherein the first opening is located intermediate two connecting legs that connect the body portion to the proximal side located adjacent the first opening.

4. The connecting rod of claim 3, further comprising an additional opening formed in at least one of the connecting legs, the additional opening extending through only a portion of the associated connecting leg.

5. The connecting rod of claim 1, wherein the first opening extends through only a portion of the body portion.

6. The connecting rod of claim 5, further comprising an additional opening formed in an opposite side of the body portion relative to the first opening, wherein the additional opening extends through only a portion of the body portion.

7. The connecting rod of claim 1, wherein the first opening has a curved shape that conforms to a curvature of one of the first coupling bore and the second coupling bore.

8. The connecting rod of claim 1, wherein the first opening is round.

9. The connecting rod of claim 1, wherein the first opening comprises a plurality of openings, at least one of the plurality of openings having a size that is different from a size of at least one other of the plurality of openings.

10. A compressor comprising:
a piston for compressing a fluid within a cylinder;
a piston rod shaft connected at a first longitudinal end to the piston and connected at a second longitudinal end to a crosshead assembly; and
a connecting rod comprising:
an elongated body portion; a big end defining a first coupling bore positioned at a first end of the body portion, the big end including a proximal side adjacent the body portion and a distal side spaced apart from the body portion;
a small end defining a second coupling bore positioned at a second end of the body portion, the small end including a proximal side adjacent the body portion and a distal side spaced apart from the body portion;
a first opening formed in the body portion adjacent one of the proximal side of the big end and the proximal side of the small end; and
a relief dimple formed in the body portion adjacent the first opening.

11. The compressor of claim 10, wherein the first opening extends completely through the body portion.

12. The compressor of claim 10, wherein the first opening is located intermediate two connecting legs that connect the body portion to the proximal side located adjacent the first opening.

13. The compressor of claim 12, further comprising an additional opening formed in at least one of the connecting legs, the additional opening extending through only a portion of the associated connecting leg.

14. The compressor of claim 10, wherein the first opening extends through only a portion of the body portion.

15. The compressor of claim 14, further comprising an additional opening formed in an opposite side of the body portion relative to the first opening, wherein the additional opening extends through only a portion of the body portion.

16. The compressor of claim 10, wherein the first opening has a curved shape that conforms to a curvature of one of the first coupling bore and the second coupling bore.

17. The compressor of claim 10, wherein the first opening is round.

18. The compressor of claim 10, wherein the first opening comprises a plurality of openings, at least one of the plurality of openings having a size that is different from a size of at least one other of the plurality of openings.

* * * * *